US006506834B2

(12) United States Patent
Takashima

(10) Patent No.: US 6,506,834 B2
(45) Date of Patent: Jan. 14, 2003

(54) PROCESS FOR PRODUCING HIGHLY WATER RESISTANT TACKIFIER RESIN

(75) Inventor: Kiyokuni Takashima, Sayama (JP)

(73) Assignee: Soken Chemical & Engineering Co., Ltd., Tokyo (JP)

( * ) Notice: Subject to any disclaimer, the term of this patent is extended or adjusted under 35 U.S.C. 154(b) by 0 days.

(21) Appl. No.: 09/757,839

(22) Filed: Jan. 10, 2001

(65) Prior Publication Data

US 2002/0013409 A1 Jan. 31, 2002

Related U.S. Application Data

(62) Division of application No. 08/899,343, filed on Jul. 23, 1997, now Pat. No. 6,211,288.

(30) Foreign Application Priority Data

Jan. 10, 1997 (JP) .................................................. 9-3111

(51) Int. Cl.$^7$ ........................ C08F 265/06; C09J 151/00
(52) U.S. Cl. ...................... 525/54.4; 524/458; 524/522; 524/523; 525/301; 525/309
(58) Field of Search ................................. 525/301, 309, 525/54.4; 524/522, 523, 458

(56) References Cited

U.S. PATENT DOCUMENTS

| 4,939,190 A | 7/1990 | Tomioka et al. |
| 5,317,055 A | 5/1994 | Yang |
| 5,385,967 A | 1/1995 | Bauer et al. |
| 5,514,435 A | 5/1996 | Suzuki et al. |
| 6,288,148 B1 * | 9/2001 | Samukawa et al. ........... 524/77 |

FOREIGN PATENT DOCUMENTS

| EP | 0 574 803 A2 | 1/1995 |
| JP | 59-058069 A | 4/1984 |
| WO | WO 91/18070 | 11/1991 |

OTHER PUBLICATIONS

Clyde Orr, "Size Measurement of Particles", Kirk–Othmer Concise Encyclopedia of Chemical Technology, 3$^{rd}$ ed., 1983, pp. 106–131, vol. 21, John Wiley & Sons, New York.

* cited by examiner

Primary Examiner—D. R. Wilson
(74) Attorney, Agent, or Firm—Webb Ziesenheim Logsdon Orkin & Hanson, P.C.

(57) ABSTRACT

A highly water resistant tackifier resin comprising an acrylic (co)polymer incorporating therein while taking up at least part of a tackifying component as a raw material on or around seed particles of 0.05 to 15 μm in average particle size having polar groups on their surfaces. The above tackifier resin can be produced by a process comprising the steps of:

dispersing a tackifying component as a raw material, an oil-soluble peroxide or oil-soluble azo initiator and an acrylic monomer in an aqueous medium in which seed particles of 0.05 to 15 μm in average particle size having polar groups at their surfaces are dispersed; and polymerizing the acrylic monomer while at least part of the tackifying component is incorporated in the acrylic (co)polymer on or around the seed particles so that the seed particles grow.

4 Claims, No Drawings

PROCESS FOR PRODUCING HIGHLY WATER RESISTANT TACKIFIER RESIN

This application is a division of application Ser. No. 08/899,343, filed Jul. 23, 1997, U.S. Pat. No. 6,211,288.

FIELD OF THE INVENTION

The present invention relates to a highly water resistant tackifier resin and a process for producing the tackifier resin.

BACKGROUND OF THE INVENTION

The adhesive technology is advancing day after day.

The advanced adhesives include an acrylic emulsion adhesive. This acrylic emulsion adhesive is an adhesive in which an acrylic copolymer as a tack component is dispersed in particulate form in water. Any organic solvent is not used in the acrylic emulsion adhesive, so that the working environment is free from organic solvent pollution and is also free from the danger of inflammation. Therefore, the acrylic emulsion adhesive is being widely used.

This acrylic emulsion adhesive is commonly produced by dispersing an acrylic monomer in water with the use of an emulsifier and polymerizing the acrylic monomer. A tackifying component is generally added to the acrylic emulsion adhesive in order to improve the adhesion performance thereof. For example, a polymerized rosin ester, a terpene resin or a petroleum resin is used as the tackifying component. It is extremely difficult to disperse such a tackifying component in water, so that a very large amount of emulsifier is needed for uniformly dispersing the tackifying component in water. The emulsifier is a surfactant, and, the higher the emulsifier content, the lower the water resistance of the obtained acrylic emulsion adhesive. On the other hand, when the amount of added emulsifier is decreased for ensuring the water resistance, uniform dispersion of the tackifying component becomes difficult, so that a new problem arises such that the adhesion properties are different between parts where the tackifying component is present and parts where the tackifying component is absent.

In this situation, there have been proposed processes in which a tackifier resin is present in the reaction system of emulsion polymerization of an acrylic monomer for producing an acrylic polymer in place of the conventional addition of the tackifying component after the production of the acrylic polymer.

For example, Japanese Patent Laid-open Publication No. 59(1984)-58069 discloses an invention of a strongly adherent emulsion-type pressure sensitive adhesive comprising a mixture of:

100 parts by weight, in terms of solid contents, of an tackifier resin emulsion (A) obtained by conducting a water-based emulsion polymerization of a resin solution consisting of 100 parts by weight of a tackifier resin dissolved in 30 to 150 parts by weight of an α,β-monoolefin monomer; and 20 to 1000 parts by weight, in terms of solid contents, of an α,β-monoolefin polymer emulsion (B) which contains no tackifier resin and exhibits a polymer second transition temperature of not higher than 10° C.

As apparent from the Examples described in the above publication, the tackifier resin emulsion (A) is produced by dispersing an alkyl acrylate such as butyl acrylate and acrylic acid as acrylic monomers and a tackifier resin in water with the use of an anionic surfactant and a nonionic surfactant and performing a polymerization. The α,β-monoolefin polymer emulsion (B) is produced in the presence of an anionic surfactant and a nonionic surfactant in the same manner except that no tackifier resin is used. The obtained tackifier resin emulsion (A) and α-monoolefin polymer emulsion (B) are blended together to thereby obtain the strongly adherent emulsion-type pressure sensitive adhesive. Therefore, this strongly adherent emulsion-type pressure sensitive adhesive contains a relatively large amount of surfactant which has been used as the emulsifier. Thus, in the polymerization of the above acrylic monomer together with the tackifier resin in the presence of a catalyst, the use of a relatively large amount of emulsifier is inevitable for the stable emulsification of the acrylate monomer containing the acrylic acid monomer.

The strongly adherent emulsion-type pressure sensitive adhesive described in the above publication is directly used as a pressure sensitive adhesive or an adhesive, so that the used emulsifier still remains in the strongly adherent emulsion-type pressure sensitive adhesive.

OBJECT OF THE INVENTION

The inventors have noted that in order to uniformly disperse the tackifying component, which has commonly been blended for improving the performance of adhesive, in the emulsion-type pressure sensitive adhesive, the use of a very large amount of emulsifier have been needed.

It is therefore an object of the present invention to provide a tackifier resin in which the content of emulsifier is reduced and, despite the reduction of the use of the emulsifier content, the tackifying component is uniformly dispersed.

It is another object of the present invention to provide a tackifier resin which has excellent water resistance.

It is a further object of the present invention to provide a process for producing a tackifier resin either with the use of a small amount of emulsifier or without the use thereof.

SUMMARY OF THE INVENTION

In one aspect of the present invention, there is provided a highly water resistant tackifier resin which comprises an acrylic (co)polymer incorporating therein at least part of a tackifying component as a raw material on or around seed particles of 0.05 to 15 μm in average particle size having polar groups on their surfaces.

This highly water resistant tackifier resin can be produced by a process which comprises the steps of:

dispersing a tackifying component as a raw material, an oil-soluble peroxide or oil-soluble azo initiator and an acrylic monomer in an aqueous medium in which seed particles of 0.05 to 15 μm in average particle size having polar groups on their surfaces are dispersed; and polymerizing the acrylic monomer while at least part of the tackifying component is incorporated in the acrylic (co)polymer on or around the surfaces of the seed particles so that the seed particles grow.

According to the present invention, by virtue of the use of seed particles of specified average particle size having polar groups on their surfaces as the starting material, the seed particles, tackifying component as a raw material and monomer component can be uniformly dispersed in the aqueous medium with the use of such a small amount of emulsifier that the water resistance is not influenced. When the thus obtained aqueous dispersion is subjected to polymerization in the presence of a specified polymerization initiator, the acrylic monomer is (co)polymerized while the tackifying component as the raw material is incorporated in the acrylic (co)polymer on or around the seed particles, so that the seed particles grow. The grown seed particles still have polar groups on their surfaces, so that they are stably dispersed in the aqueous medium.

The amount of emulsifier contained in the thus obtained tackifier resin of the present invention is very small. Therefore, an adhesive prepared by blending this tackifier resin with an acrylic polymer emulsion exhibits an excellent water resistance despite that it is an emulsion.

DETAILED DESCRIPTION OF THE INVENTION

The highly water resistant tackifier resin of the present invention along with the process therefor will be described in detail below.

The highly water resistant tackifier resin of the present invention can be produced by a process which comprises the steps of:

dispersing a tackifying component as a raw material, an oil-soluble peroxide or oil-soluble azo initiator and an acrylic monomer in an aqueous medium in which seed particles of 0.05 to 15 μm in average particle size having polar groups on their surfaces are dispersed; and polymerizing the acrylic monomer while at least part of the tackifying component is incorporated in the acrylic (co)polymer on or around the surfaces of the seed particles so that the seed particles grow.

Examples of the seed particles having polar groups on their surfaces for use in the present invention include:

seed particles of a copolymer obtained by polymerizing a (meth)acrylic ester and a monomer which can be copolymerized with the (meth)acrylic ester and has a polar group optionally together with another monomer in aqueous dispersion;

seed particles of a copolymer obtained by polymerizing a styrene monomer such as styrene or methylstyrene and a monomer which can be copolymerized with the styrene monomer and has a polar group optionally together with another monomer in aqueous dispersion; and seed particles of a copolymer obtained by polymerizing a vinyl ester monomer such as vinyl acetate or vinyl propionate and a monomer which can be copolymerized with the vinyl ester monomer and has a polar group optionally together with another monomer in aqueous dispersion. Of these, the use of seed particles of a copolymer obtained by polymerizing a (meth) acrylic ester and a monomer which can be copolymerized with the (meth)acrylic ester and has a polar group optionally together with another monomer in aqueous dispersion is preferred in the present invention.

The above used (meth)acrylic ester is preferred to be one in which an alkyl group forming the ester group has 4 to 12 carbon atoms. Specific examples of such (meth)acrylic esters include n-butyl (meth)acrylate, isobutyl (meth) acrylate, pentyl (meth)acrylate, hexyl (meth)acrylate, heptyl (meth)acrylate, n-octyl (meth)acrylate, isooctyl (meth) acrylate, nonyl (meth)acrylate, decyl (meth)acrylate, undecyl (meth)acrylate, dodecyl (meth)acrylate, 2-ethylhexyl (meth)acrylate and isononyl (meth)acrylate.

Of these, 2-ethylhexyl (meth)acrylate, isononyl (meth) acrylate, isobutyl (meth)acrylate and isooctyl (meth)acrylate are preferred.

The above monomer which can be copolymerized with the (meth)acrylic ester and has a polar group is preferred to be a compound which has not only a —COOH or —SO$_3$H group as a polar group but also an ethylenic double bond capable of copolymerizing with the (meth)acrylic ester. Examples of such polar group having monomers include (meth)acrylic acid, itaconic acid, maleic acid, fumaric acid, t-butylacrylamidesulfonic acid (IUPAC name: 2-acrylamido-2methyl-1-propanesulfonic acid), styrenesulfonic acid and salts thereof.

It is requisite that polar groups be present on surfaces of the seed particles for use in the present invention. When the polar groups originate in the above monomer possessing a polar group, it is especially preferred that the monomer possessing a polar group be acrylic acid, methacrylic acid, t-butylacrylamidesulfonic acid (IUPAC name: 2-acrylamido-2-methyl-1-propanesulfonic acid) or the like.

In the production of the seed particles for use in the present invention, other monomers may be copolymerized with the above, examples of which include 2-hydroxyethyl (meth)acrylate, vinyl acetate, styrene, divinylbenzene, methyl (meth)acrylate, ethyl (meth)acrylate, (meth) acrylamide, dimethylamide methacrylate, dimethylamide acrylate, stearyl (meth)acrylate, (meth)acrylonitrile and behenyl (meth)acrylate.

The seed particles for use in the present invention can be obtained by dispersing the above monomers in an aqueous medium and carrying out a copolymerization. To disperse the above monomers in the aqueous medium, a forced mechanical blending method can be used to form a fine dispersion and a water soluble polymer or a surfactant as an emulsifier can also be used. Examples of suitable surfactants which can be used as the emulsifier include anionic, nonionic, cationic and reactive surfactants. Especially, the use of anionic and/or reactive surfactant is preferred in the present invention. The reactive surfactant has not only hydrophilic and lipophilic groups but also a reactive group, and thus plays a dual role, one being an emulsifier for dispersing the monomer, etc. in the aqueous medium prior to the reaction, the other being a monomer capable of reacting with other monomers during the reaction to form seed particles.

A reaction initiator is used in the production of the seed particles. In the present invention, it is requisite that polar groups be present on surfaces of the seed particles and may originate in either the above polar group having monomer or the reaction initiator. Examples of the reaction initiators which can be used for providing the polar groups originating in the reaction initiator on the surfaces of the seed particles include potassium persulfate, ammonium persulfate and 4,4'-azobis-4-cyanovalerianic acid. When it is intended to provide sulfonate groups on surfaces of the seed particles, potassium persulfate and ammonium persulfate are preferably used as the reaction initiator.

The seed particles can be produced by finely dispersing the above monomers and reaction initiator in the aqueous medium and performing an emulsion polymerization according to the customary procedure. For providing polar groups on the surfaces of the seed particles so that the seed particles have self-dispersibility, use is generally made of 60 to 99.9 parts by weight, preferably 80 to 90 parts by weight of the (meth)acrylic ester, 0.1 to 20 parts by weight, preferably 2 to 8 parts by weight of the polar group having monomer, 0 to 20 parts by weight, preferably 0 to 10 parts by weight of the other monomer and 0.05 to 3 parts by weight, preferably 0.1 to 0.5 part by weight, based on 100 parts by weight of the total of the above monomers, of the reactive initiator.

Seed particles which exhibit a high dispersion stability in the aqueous medium can be produced by the employment of base monomers for constructing the seed particles, such as a (meth)acrylic ester and styrene, and a polar group having monomer in a weight mixing ratio of about 99:1 to 80:20 in the production of the seed particles. When a water soluble resin or a surfactant as an emulsifier is used, it is preferred that the use thereof be generally minimized to 1 part by weight or less, especially 0.1 to 1 part by weight and, still especially 0.1 to 0.5 part by weight per 100 parts by weight of the total of the above monomers. With respect to the reactive surfactant (reactive emulsifier), however, its function as a surfactant is almost lost by being incorporated in the seed particles after the completion of the reaction, so that it can be used in an amount larger than that of the other customary emulsifier. In the production of the seed particles, the reactive emulsifier is generally used in an amount of 0.05 to 3 parts by weight, preferably 0.1 to 0.5 part by weight. The reactive emulsifier can be used in combination with other emulsifiers.

It is requisite that the thus obtained seed particles have an average particle size ranging from 0.05 to 15 μm. The average particle size is preferred to range from 0.2 to 10 μm, especially from 0.3 to 5 μm.

Although being in fine particulate form as mentioned above, the seed particles are stably dispersed in the aqueous medium because they have polar groups on their surfaces. The content of seed particles (nonvolatile content) in the aqueous medium is generally adjusted to about 40 to 70% by weight.

The above production of seed particles causes the polar groups originating in the polar group having monomer or originating in the reactive initiator to localize on the surfaces of the seed particles (namely, the polar group content is greater in the vicinity of the surfaces of the seed particles than in the core parts thereof), so that, by virtue of the polar groups, the seed particles have high affinity with the aqueous medium to thereby ensure the stable dispersion of the seed particles in the aqueous medium.

The thus obtained emulsion containing seed particles can directly be subjected to the subsequent step, or an aqueous medium can be added thereto for adjusting the concentration thereof before the transfer to the subsequent step. Further, the seed particles can be separated from the emulsion, optionally purified, and re-dispersed in a new aqueous medium before use.

In the present invention, thereafter, an acrylic monomer and a tackifying component as a raw material are dispersed in the above obtained emulsion containing seed particles.

Examples of suitable acrylic monomers include butyl (meth)acrylate, pentyl (meth)acrylate, hexyl (meth)acrylate, heptyl (meth)acrylate, octyl (meth)acrylate, nonyl (meth) acrylate, decyl (meth)acrylate, undecyl (meth)acrylate, dodecyl (meth)acrylate, 2-ethylhexyl (meth)acrylate, isononyl (meth)acrylate, (meth)acrylic acid, itaconic acid, maleic acid, fumaric acid, 2-hydroxyethyl (meth)acrylate, methyl (meth)acrylate, ethyl (meth)acrylate, (meth) acrylamide, dimethylamide methacrylate, dimethylamide acrylate, stearyl (meth)acrylate, behenyl (meth)acrylate, acrylamide, N-methylolacrylamide, acrylonitrile, glycidyl methacrylate, isobutyl (meth)acrylate, isobornyl (meth) acrylate and dicyclopentyl (meth)acrylate. The above acrylic monomer can be used in combination with other monomers such as vinyl acetate, styrene, divinylbenzene, ethylene, crotonic acid, vinyl propionate, α-methylstyrene, dicyclopentene and coumarone.

Examples of the raw material tackifying components employed in combination with the above acrylic monomer include a rosin resin, a polyterpene resin, an aliphatic petroleum resin, an aromatic petroleum resin, a copolymer petroleum resin, an alicyclic petroleum resin, a xylene resin and an elastomer.

Examples of rosin resins which can be used as the raw material tackifying component include raw rosin, hydrogenated rosin and hydrogenated rosin ester. Examples of the polyterpene resins include α-pinene resin and terpene phenol resin. Examples of the aliphatic petroleum resins include resins supplied with the tradenames Escorez (produced by Tonex Co., Ltd.), Hi-rez (produced by Mitsui Petrochemical Industries, Ltd.), Quintone (produced by Nippon Zeon Co., Ltd.), Piccovar Resin (produced by Picco Co., Ltd.) and Tackirol (produced by Sumitomo Chemical Co., Ltd.). Examples of the aromatic petroleum resins include resins supplied with the tradenames Petrosin (produced by Mitsui Petrochemical Industries, Ltd.), Neopolymer (produced by Nippon Petrochemical Co., Ltd.) and Petcoal (produced by Tosoh Corporation). Examples of the copolymer petroleum resins include resins supplied with the tradenames FTR (produced by Mitsui Petrochemical Industries, Ltd.), Hiresin (produced by Toho Chemical Industry Co., Ltd.) and Super STA-TAC (produced by Reichhold). Examples of the alicyclic petroleum resins include resins supplied with the tradenames Arcon (produced by Arakawa Chemical Industry Co., Ltd.) and Escorez (produced by Tonex Co., Ltd.). Examples of suitable elastomers include natural rubber, isoprene rubber, styrene/butadiene rubber, butyl rubber, silicone rubber, chloroprene rubber, nitrile rubber and regenerated rubber.

In particular, preferred use is made of pentaerythritol ester of polymerized rosin [tradenames: Pentalyn C-J (produced by Rika-Hercules Inc.) and Pensel D-135 (produced by Arakawa Chemical Industry Co., Ltd.)], aromatic petroleum resin [tradename: Neopolymer S (produced by Nippon Petrochemical Co., Ltd.)], disproportionated rosin ester [tradename: Super Ester A-100 (produced by Arakawa Chemical Industry Co., Ltd.)], terpene polymer [tradename: YS Resin PX-1000 (produced by Yasuhara Chemical Co., Ltd.)], aromatic modified terpene polymer [tradename: YS Resin TO-105 (produced by Yasuhara Chemical Co., Ltd.), styrene monomer/aliphatic monomer copolymer [tradenames: FTR-6110 (produced by Mitsui Petrochemical Industries, Ltd.) and FTR-6100 (produced by Mitsui Petrochemical Industries, Ltd.)] and methyl ester of hydrogenated rosin [tradename: Hercolyn D (produced by Rika-Hercules Inc.)].

In the present invention, it is generally preferred to employ a tackifying component having a softening point of 20 to 150° C., especially 95 to 135° C.

The use of the raw material tackifying component having the above softening point imparts strikingly excellent tack properties to the tackifier resin obtained by the process of the present invention.

According to the present invention, a reaction initiator is used to initiate the polymerization of a mixture of the above acrylic monomer and tackifying component added to the seed particles containing emulsion. It is preferred in the present invention that an oil-soluble peroxide or oil-soluble azo compound be used as the reaction initiator. Examples of suitable oil-soluble peroxides include benzoyl peroxide, lauroyl peroxide and dialkyl perester (tradename: Kayaester TMPO-70 produced by Kayaku Akzo Corporation). Examples of suitable oil-soluble azo compounds include azobisisobutyronitrile. This oil-soluble peroxide or oil-soluble azo compound is generally uniformly mixed in the above raw material tackifying component and incorporated in the reaction system.

In the present invention, the acrylic monomer is added in an amount of generally 120 to 750 parts by weight, preferably 140 to 200 parts by weight and the tackifying component as a raw material is added in an amount of generally 0 to 160 parts by weight, preferably 40 to 160 parts by weight, both based on 100 parts by weight of the seed particles having polar groups on their surfaces. Moreover, the oil-soluble peroxide as a reaction initiator is added in an amount of 0.1 to 8 parts by weight, preferably 1 to 4 parts by weight, based on 100 parts by weight of the final tackifier resin.

In the present invention, the above acrylic monomer, raw material tackifying component and oil-soluble reaction initiator are dispersed in water to prepare a dispersion which is added to the emulsion of the seed particles having polar groups on their surfaces and then polymerization is performed. The acrylic monomer, raw material tackifying component and oil-soluble reaction initiator can be dispersed in water by forced agitation without the use of an emulsifier or can be emulsified in water with the use of an extremely small amount of emulsifier. When the emulsifier is employed, it is added so that the proportion of emulsifier to the final tackifier resin of the present invention (solid contents) is generally up to 2% by weight, preferably up to 1% by weight, still preferably up to 0.9% by weight, yet still preferably up to 0.5% by weight and optimally up to 0.3% by weight. When the emulsifier is employed, the type of the used emulsifier is not particularly limited as long as it is appropriately selected from among anionic and nonionic emulsifiers so as to have such HLB that the mixture of the above acrylic monomer, raw material tackifying component and oil-soluble reaction initiator can be emulsified. The reactive emulsifier mentioned hereinbefore can also be used as the emulsifier at this stage. When the reactive emulsifier is employed, it scarcely exhibits the function as an emulsifier after the completion of the reaction, so that the reactive emulsifier can be added in an amount greater than the above without detriment to the water resistance of the final tackifier resin.

In the present invention, the amount of emulsifier can be extremely small as mentioned above because the self dispersible seed particles are used as the starting material. The tackifier resin dispersion of the present invention exhibits a strikingly excellent water resistance as compared with that of the conventional tackifier resin dispersion by virtue of the use of the above self dispersible seed particles and also the execution of polymerization with the use of an extremely small amount of emulsifier or without the use of emulsifier.

The above components can be polymerized by a process similar to that customarily employed in the production of acrylic resin. The above materials are charged in a reactor, the air of the reaction system is replaced by inert gas such as nitrogen gas and the reaction fluid is heated at about 50 to 100° C. at which the reaction is executed for 1 to 10 hr.

In this reaction, the acrylic monomer is polymerized while the raw material tackifying component is incorporated in the acrylic (co)polymer on or around the seed particles so that as the reaction proceeds the seed particles increase in their size. Generally, the reaction is continued until the average particle size becomes 1.2 to 30 times that of the seed particles. Therefore, the final tackifier resin generally has an average particle size ranging from 0.5 to 22 $\mu$m. In the polymerization of the acrylic monomer together with the tackifying component as a raw material in the presence of the oil-soluble reaction initiator, the acrylic monomer is polymerized from the inner seed particles while the raw material tackifying component is incorporated in the acrylic polymer on or around the seed particles, so that new tackifier resin particles consisting of the acrylic polymer combined with the raw material tackifying component are obtained.

Although the thus produced tackifier resin dispersion as it is can be used as a pressure sensitive adhesive, it is preferably blended with ingredients like tackifiers having been commonly used in acrylic resins before application.

The content of emulsifier in the tackifier resin of the present invention is not greater than 2% by weight, which is only about 1/10 or less of that in tack resin dispersions having been commonly produced in aqueous mediums. Generally, water resistance of a tackifier resin is more influenced by a hydrophilic substance such as emulsifier contained in the tackifier resin than by the structure of the tackifier resin per se. Tackifier agents whose emulsifier content is not greater than 2% by weight, such as the tackifier resin of the present invention, scarcely suffer from a lowering of water resistance caused by the emulsifier. Therefore, the tackifier resin of the present invention has strikingly excellent water resistance.

EFFECT OF THE INVENTION

The tackifier resin of the present invention has excellent water resistance because the emulsifier content thereof is extremely small.

The emulsifier content can be lowered in the present invention because seed particles of specified average particle size having polar groups at their surfaces so as to possess self-dispersibility are used as the starting material. If an acrylic monomer or seed particles having an average particle size outside of that specified in the present invention is used as the starting material as in the prior art, a large amount of emulsifier is needed in the emulsification of the tackifying component and acrylic monomer, so that the tackifier resin having excellent water resistance according to the present invention cannot be produced. Further, the oil-soluble reaction initiator used according to the present invention enables producing a tackifier resin having markedly improved water resistance as compared with that of the tackifier resin obtained with the use of an inorganic reaction initiator (e.g., ammonium persulfate).

Because of the above excellent water resistance, the tackifier resin of the present invention can suitably be used in adhesive application fields in which the presence of water has caused the adhesive strength to deteriorate with the passage of time.

EXAMPLE

The present invention will now be illustrated in greater detail with reference to the following Examples, which should not be construed as limiting the scope of the invention.

Production Example 1

Preparation of Seed Polymer A 400 g of water was put in a vessel, and 5 g of anionic emulsifier (N-707SF produced by Nippon Nyukazai Co., Ltd.) was dissolved in the water. Subsequently, 60 g of t-butylacrylamidesulfonic acid (IUPAC name: 2-acrylamido-2-methyl-1-propanesulfonic acid)(TBAS-Q produced by Nitto Chemical Industry Co., Ltd.), 20 g of acrylic acid, 30 g of acrylonitrile, 890 g of butyl acrylate and 0.5 g of n-dodecylmercaptan were added to the solution, thereby obtaining monomer emulsion (A).

Separately, 500 g of water and 3 g of azobisisocyanovaleric acid were put in a 2-lit. four-necked flask equipped with a Dimroth condenser, a thermometer, a nitrogen gas blowing tube and a dropping funnel, and the air of the flask was replaced by nitrogen gas which was introduced through the nitrogen gas blowing tube in the flask. The solution of the flask was heated to 75° C.

The above monomer emulsion (A) was dropped through the dropping funnel in the solution of the flask over a period of 3 hr. After the completion of the dropping, the reaction mixture was heated to 80° C., which was maintained for 2 hr to thereby complete the polymerization.

The resultant emulsion had a nonvolatile content of 50.2% and contained particles having an average particle size of 0.31 µm (seed polymer A).

Production Example 2

Preparation of Seed Polymer B 400 g of water was put in a vessel, and 1.5 g of anionic reactive emulsifier (Aqualon HS-10 produced by Daiichi Kogyo Seiyaku Co., Ltd.) was dissolved in the water. Subsequently, 60 g of t-butylacrylamidesulfonic acid (IUPAC name: 2-acrylamido-2-methyl-1propanesulfonic acid)(TBAS-Q produced by Nitto Chemical Industry Co., Ltd.), 20 g of acrylic acid, 30 g of acrylonitrile, 920 g of n-butylacrylate and 0.5 g of n-dodecylmercaptan were added to the solution, thereby obtaining monomer emulsion (B).

Separately, 500 g of water and 3 g of azobisisocyanovaleric acid were put in a 2-lit. four-necked flask equipped with a Dimroth condenser, a thermometer, a nitrogen gas blowing tube and a dropping funnel, and the air of the flask was replaced by nitrogen gas which was introduced through the nitrogen gas blowing tube in the flask. The solution of the flask was heated to 75° C.

The above monomer emulsion (B) was dropped through the dropping funnel in the solution of the flask over a period of 3 hr. After the completion of the dropping, the reaction mixture was heated to 80° C., which was maintained for 2 hr to thereby complete the polymerization.

The resultant emulsion had a nonvolatile content of 50.1% and contained particles having an average particle size of 0.35 µm (seed polymer B).

Production Example 3

Preparation of Seed Polymer C 400 g of water was put in a vessel, and 5 g of anionic emulsifier (N-707SF produced by Nippon Nyukazai Co., Ltd.) was dissolved in the water. Subsequently, 20 g of acrylic acid, 30 g of acrylonitrile, 950 g of butyl acrylate and 0.5 g of n-dodecylmercaptan were added to the solution, thereby obtaining monomer emulsion (C).

Separately, 500 g of water and 3 g of azobisisocyanovaleric acid were put in a 2-lit. four-necked flask equipped with a Dimroth condenser, a thermometer, a nitrogen gas blowing tube and a dropping funnel, and the air of the flask was replaced by nitrogen gas which was introduced through the nitrogen gas blowing tube in the flask. The solution of the flask was heated to 75° C.

The above monomer emulsion (C) was dropped through the dropping funnel in the solution of the flask over a period of 3 hr. After the completion of the dropping, the reaction mixture was heated to 80° C., which was maintained for 2 hr to thereby complete the polymerization.

The resultant emulsion had a nonvolatile content of 50.5% and contained particles having an average particle size of 0.37 µm (seed polymer C).

Example 1

250 g of the seed polymer A prepared in the above Production Example 1 was charged in a 2-lit. flask, and 1 g of benzoyl peroxide as a reaction initiator was added thereto and agitated for 30 min while replacing the air within the reactor flask with nitrogen gas.

Separately, 250 g of pentaerythritol ester of polymerized rosin (Pentalyn C-J produced by Rika-Hercules Inc., having a softening point of 130° C.) as the raw material tackifying component and 7.5 g of n-dodecylmercaptan as a chain transfer agent were dissolved in 87.5 g of isobutyl acrylate, and 125 g of water, 2.5 g of anionic emulsifier (nonionic anion emulsifier Newcol 516SN produced by Nippon Nyukazai Co., Ltd.) and 7.5 g of acrylic acid were added to the solution and agitated, thereby obtaining emulsion (1).

The thus prepared emulsion (1) was charged in the above flask and the air within the reactor flask was replaced with nitrogen gas for 30 min. Then, the reaction mixture was heated to 72° C., which was maintained for 5 hr to thereby obtain a tackifier resin of the present invention.

The resultant emulsion had a nonvolatile content (tackifier resin of the present invention) of 66.6% and contained particles having an average particle size of 2.14 µm.

Example 2

Another tackifier resin of the present invention was produced in the same manner as in Example 1, except that 150 g of pentaerythritol ester of polymerized rosin (Pentalyn C-J produced by Rika-Hercules Inc., having a softening point of 130° C.) and 100 g of disproportionated rosin ester (Super Ester A-100 produced by Arakawa Chemical Industry Co., Ltd., having a softening point of 100° C.) were used in place of 250 g of pentaerythritol ester of polymerized rosin (Pentalyn C-J produced by Rika-Hercules Inc., having a softening point of 130° C.) as the raw material tackifying component.

The resultant emulsion had a nonvolatile content (tackifier resin of the present invention) of 66.9% and contained particles having an average particle size of 1.89 µm.

Example 3

A further tackifier resin of the present invention was produced in the same manner as in Example 1, except that 150 g of pentaerythritol ester of polymerized rosin (Pentalyn C-J produced by Rika-Hercules Inc., having a softening point of 130° C.) and 100 g of petroleum resin (Neopolymer S produced by Nippon Petrochemical Co., Ltd., having a softening point of 80° C.) were used in place of 250 g of pentaerythritol ester of polymerized rosin (Pentalyn C-J produced by Rika-Hercules Inc., having a softening point of 130° C.) as the raw material tackifying component.

The resultant emulsion had a nonvolatile content (tackifier resin of the present invention) of 65.7% and contained particles having an average particle size of 3.14 µm.

Example 4

Still a further tackifier resin of the present invention was produced in the same manner as in Example 2, except that 5 g of reactive emulsifier (anionic reactive emulsifier Aqualon HS-10 produced by Dai-ichi Kogyo Seiyaku Co., Ltd.) was used in place of 2.5 g of emulsifier (Newcol 516SN produced by Nippon Nyukazai Co., Ltd.).

The resultant emulsion had a nonvolatile content (tackifier resin of the present invention) of 65.4% and contained particles having an average particle size of 4.32 µm.

Example 5

Still a further tackifier resin of the present invention was produced in the same manner as in Example 3, except that 5 g of reactive emulsifier (anionic reactive emulsifier Aqualon HS-10 produced by Dai-ichi Kogyo Seiyaku Co., Ltd.) was used in place of 2.5 g of emulsifier (Newcol 516SN produced by Nippon Nyukazai Co., Ltd.).

The resultant emulsion had a nonvolatile content (tackifier resin of the present invention) of 64.3% and contained particles having an average particle size of 4.80 μm.

Example 6

Still a further tackifier resin of the present invention was produced in the same manner as in Example 2, except that the seed polymer B produced in Production Example 2 was used in place of the seed polymer A.

The resultant emulsion had a nonvolatile content (tackifier resin of the present invention) of 66.6% and contained particles having an average particle size of 3.14 μm.

Example 7

Still a further tackifier resin of the present invention was produced in the same manner as in Example 3, except that the seed polymer C produced in Production Example 3 was used in place of the seed polymer A.

The resultant emulsion had a nonvolatile content (tackifier resin of the present invention) of 65.6% and contained particles having an average particle size of 3.50 μm.

Example 8

Still a further tackifier resin of the present invention was produced in the same manner as in Example 2, except that the seed polymer B produced in Production Example 2 was used in place of the seed polymer A and that 5 g of reactive emulsifier (anionic reactive emulsifier Aqualon HS-10 produced by Dai-ichi Kogyo Seiyaku Co., Ltd.) was used in place of 2.5 g of emulsifier (Newcol 516SN produced by Nippon Nyukazai Co., Ltd.).

The resultant emulsion had a nonvolatile content (tackifier resin of the present invention) of 65.6% and contained particles having an average particle size of 3.50 μm.

Example 9

Still a further tackifier resin of the present invention was produced in the same manner as in Example 2, except that the seed polymer B produced in Production Example 2 was used in place of the seed polymer A and that 5 g of reactive emulsifier (anionic reactive emulsifier Aqualon HS-10 produced by Dai-ichi Kogyo Seiyaku Co., Ltd.) was used in place of 2.5 g of emulsifier (Newcol 516SN produced by Nippon Nyukazai Co., Ltd.)

The resultant emulsion had a nonvolatile content (tackifier resin of the present invention) of 65.1% and contained particles having an average particle size of 4.35 μm.

Comparative Example 1

A tackifier resin was produced in the same manner as in Example 1, except that the amount of added emulsifier (Newcol 516SN produced by Nippon Nyukazai Co., Ltd.) was changed to 12.5 g.

The resultant emulsion had a nonvolatile content (tackifier resin) of 66.5% and contained particles having an average particle size of 2.05 μm.

Comparative Example 2

A tackifier resin was produced in the same manner as in Example 2, except that the amount of added emulsifier (Newcol 516SN produced by Nippon Nyukazai Co., Ltd.) was changed to 12.5 g.

The resultant emulsion had a nonvolatile content (tackifier resin) of 65.5% and contained particles having an average particle size of 2.35 μm.

Comparative Example 3

A tackifier resin was produced in the same manner as in Example 3, except that the amount of added emulsifier (Newcol 516SN produced by Nippon Nyukazai Co., Ltd.) was changed to 12.5 g.

The resultant emulsion had a nonvolatile content (tackifier resin) of 65.5% and contained particles having an average particle size of 2.35 μm.

Comparative Example 4

A tackifier resin was produced in the same manner as in Example 1, except that methyl methacrylate particles having an average particle size of 18 μm were used in place of the seed polymer A. The methyl methacrylate particles had no polar group on their surfaces.

The resultant emulsion had a nonvolatile content (tackifier resin) of 66.9% and contained particles having an average particle size of 28 μm.

Comparative Example 5

A tackifier resin was produced in the same manner as in Example 2, except that methyl methacrylate particles having an average particle size of 18 μm were used in place of the seed polymer A. The methyl methacrylate particles had no polar group at their surfaces.

The resultant emulsion had a nonvolatile content (tackifier resin) of 66.9% and contained particles having an average particle size of 28 μm.

Comparative Example 6

Production of a tackifier resin was attempted in the same manner as in Example 2, except that methyl methacrylate particles having an average particle size of 0.03 μm were used in place of the seed polymer A. However, an aggregation occurred during the polymerization reaction.

Comparative Example 7

Production of a tackifier resin was attempted in the same manner as in Example 3, except that methyl methacrylate particles having an average particle size of 0.03 μm were used in place of the seed polymer A. However, an aggregation occurred during the polymerization reaction.

Example 10 and Comparative Example 8

Each of the tackifier resins produced in the above Examples 1 to 9 and Comparative Examples 1 to 5 was mixed with an acrylic resin in a solid contents weight ratio of 45:55, thereby obtaining an adhesive composition. The acrylic resin used here was a copolymer of butyl acrylate and acrylic acid in weight ratio of 96:4 and had a weight average molecular weight of 300 thousand.

This adhesive composition was applied to both surfaces of a nonwoven fabric in an adhesive layer thickness of 140 μm, thereby obtaining a double coated adhesive tape.

The double coated adhesive tape were measured for the adhesive strength, holding power, ball tack and moisture resistant holding power (conditions: 40° C. and 90% RH) in accordance with Japanese Industrial Standards JIS Z-0237-8, Z-0237-11 and Z-0237-12.

The results are given in Table 1.

TABLE 1

| Tackifier resin produced by | Example 10 | | | | | | | | | Comp. Ex. 1 | Comp. Ex. 2 | Comp. Ex. 3 | Comparative Example 8 Comp. Ex. 4 | Comp. Ex. 5 |
|---|---|---|---|---|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 | | | | | |
| Nonvolatile content (%) | 66.6 | 66.9 | 65.7 | 65.4 | 64.3 | 66.6 | 65.6 | 65.9 | 65.1 | 66.5 | 65.5 | 65.9 | 66.9 | 66.9 |
| Viscosity (cps) | 1200 | 2200 | 850 | 1000 | 920 | 880 | 750 | 700 | 790 | 1850 | 1500 | 890 | 35 | 40 |
| Average particle size ($\mu$m) | 2.14 | 1.89 | 3.14 | 4.32 | 4.80 | 3.14 | 3.50 | 5.20 | 4.35 | 2.05 | 2.35 | 3.15 | 28.0 | 30.0 |
| Adhesive strength | | | | | | | | | | | | | | |
| SUS (g/25 mm) | 1350 | 1400 | 1200 | 1380 | 1360 | 1450 | 1300 | 1100 | 1150 | 1250 | 1350 | 1350 | <100 | <100 |
| PE (g/25 mm) | 480 | 500 | 420 | 380 | 520 | 500 | 490 | 350 | 420 | 400 | 420 | 350 | <50 | <50 |
| Holding power (40° C., DRY) | >24 Hr | >24 Hr | >24 Hr | >24 Hr | >24 Hr | >24 Hr | >24 Hr | >24 Hr | >24 Hr | >24 Hr | 20 Hr | 20 Hr | <1 Hr | <1 Hr |
| Ball tack | 20 | 22 | 24 | 21 | 21 | 22 | 24 | 23 | 24 | 25 | 26 | 21 | <3 | <3 |
| Moisture resistance holding power (40° C., 90% RH) | >24 Hr | >24 Hr | >24 Hr | >24 Hr | >24 Hr | >24 Hr | >24 Hr | >24 Hr | >24 Hr | <1 Hr | <1 Hr | <1 Hr | <1 Hr | <1 Hr |

What is claimed is:

1. A process for producing a highly water resistant tackifier resin which comprises the steps of:

dispersing a tackifying component, an oil-soluble peroxide or oil-soluble azo initiator, an acrylic monomer and an emulsifier in an amount of 0 to 2% by weight based on the obtained tackifier resin in an aqueous medium in which self-dispersible seed particles having polar groups on their surfaces are dispersed, wherein the amount of the acrylic monomer is 140 to 200 parts by weight and the amount of the tackifying component is 40 to 160 parts by weight, both based on 100 parts by weight of the seed particles; and polymerizing the acrylic monomer while at least part of the tackifying component is incorporated in the acrylic (co)polymer on or around the seed particles so that the seed particles grow 1.2 to 30 times that of the seed particles in linear dimension, based on average particle size thereof.

2. The process as claimed in claim 1, wherein the polar groups of the seed particles are carboxyl groups originating in (meth)acrylic acid and/or sulfonate groups originating in a polymerization initiator used in production of the seed particles or originating in a sulfonate containing monomer.

3. The process as claimed in claim 1, wherein the tackifying component is at least one resin selected from the group consisting of a rosin resin, a polyterpene resin, an aliphatic petroleum resin, an aromatic petroleum resin, a copolymer petroleum resin, an alicyclic petroleum resin, a xylene resin and a elastomer.

4. The process as claimed in claim 2, wherein the sulfonate group is originating in 2-acrylamido-2-methyl-1-propanesulfonic acid.

* * * * *

UNITED STATES PATENT AND TRADEMARK OFFICE
CERTIFICATE OF CORRECTION

PATENT NO. : 6,506,834 B2
DATED : January 14, 2003
INVENTOR(S) : Kiyokuni Takashima It is certified that error appears in the above-identified patent and that said Letters Patent is hereby corrected as shown below:

Column 1,
Line 17, "Any organic" should read -- No organic --.
Lines 17-18, "is not" should read -- is --.
Line 30, "so that a" should read -- so a --.
Line 31, "needed for" should read -- needed to --.
Line 31, "dispersing" should read -- disperse --.
Line 62, "As apparent" should read -- As is apparent --.

Column 3,
Line 8, "exhibits an excellent" should read -- exhibits excellent --.
Line 9, "despite that" should read -- despite the fact that --.

Column 4,
Line 3, "such polar group having monomers include" should read -- such monomers containing polar groups include --.

Column 5,
Line 5, "surfactant as" should read -- surfactant is used as --.
Line 5, "emulsifier is used, it is" should read -- emulsifier, it is --.
Lines 12-13, "so that it" should read -- so it --.
Line 32, "particles (namely, the" should read -- particles because the --.
Line 34, "thereof), so that, by" should read -- thereof. Therefore, by --.
Line 61, "monomer can be" should read -- monomers can be --.

Column 7,
Line 15, "surfaces and then" should read -- surfaces, and then --.
Line 32, "hereinbefore" should read -- above --.
Line 44, "dispersion by virtue" should read -- dispersion, by virtue --.

UNITED STATES PATENT AND TRADEMARK OFFICE
CERTIFICATE OF CORRECTION

PATENT NO. : 6,506,834 B2
DATED : January 14, 2003
INVENTOR(S) : Kiyokuni Takashima It is certified that error appears in the above-identified patent and that said Letters Patent is hereby corrected as shown below:

Column 8,
Lines 36-37, "enables producing" should read -- enables the production of --.
Line 42, "of the above excellent" should read -- of its excellent --.

Signed and Sealed this

Sixth Day of May, 2003

JAMES E. ROGAN
*Director of the United States Patent and Trademark Office*